(12) United States Patent
Ueno et al.

(10) Patent No.: US 8,410,762 B2
(45) Date of Patent: Apr. 2, 2013

(54) DC-DC CONVERTER

(75) Inventors: Takeshi Ueno, Kawasaki (JP); Tetsuro Itakura, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/306,119

(22) Filed: Nov. 29, 2011

(65) Prior Publication Data
US 2012/0242310 A1 Sep. 27, 2012

(30) Foreign Application Priority Data
Mar. 25, 2011 (JP) ................................. 2011-067172

(51) Int. Cl.
*G05F 1/613* (2006.01)
*G05F 1/40* (2006.01)

(52) U.S. Cl. .......................... 323/225; 323/271; 323/285

(58) Field of Classification Search .................. 323/222, 323/225, 271, 282–285, 351
See application file for complete search history.

(56) References Cited

U.S. PATENT DOCUMENTS

| | | | |
|---|---|---|---|
| 7,230,406 B2 * | 6/2007 | Huang et al. | 323/222 |
| 7,304,464 B2 * | 12/2007 | Weng et al. | 323/285 |
| 8,138,732 B2 * | 3/2012 | Tseng et al. | 323/282 |
| 2006/0049815 A1 * | 3/2006 | Ho et al. | 323/282 |
| 2012/0242300 A1 * | 9/2012 | Ueno et al. | 323/234 |

OTHER PUBLICATIONS

M. Ordonez et al; Selection of a Curved Switching Surface for Buck Converters; IEEE Transactions o Power Electronics; vol. 21, No. 4, Jul. 2006; pp. 1148-1153.
LM3676 2MHz, 600A Step-Down DC-DC Converter With Mode Control; Dec. 2006, National Semiconductor Corporation; pp. 1-19.

* cited by examiner

*Primary Examiner* — Jessica Han
(74) *Attorney, Agent, or Firm* — Holtz, Holtz, Goodman & Chick, P.C.

(57) ABSTRACT

The high-side switch has one end connected to the input terminal. The low-side switch has one end connected to other end of the high-side switch and other end connected to a ground terminal. The inductor has one end connected to the other end of the high-side switch and other end connected to the output terminal. The capacitor has one end connected to the other end of the inductor and other end connected to the ground terminal. The high-side switch controlling circuit generates and supplies a high-side switch controlling signal based on a target voltage of the output terminal, the output voltage of the output terminal, and a current flowing through the capacitor, to the high-side switch. The low-side switch controlling circuit generates and supplies a low-side switch controlling signal based on the high-side switch controlling signal and a current flowing through the inductor, to the low-side switch.

6 Claims, 4 Drawing Sheets

DC-DC CONVERTER

CROSS REFERENCE TO RELATED APPLICATIONS

This application is based upon and claims the benefit of priority from the prior Japanese Patent Application No. 2011-67172, filed on Mar. 25, 2011, the entire contents of which are incorporated herein by reference.

FIELD

An embodiment of the present invention relates to a DC-DC converter.

BACKGROUND

In a synchronous rectification DC-DC converter, a forward voltage drop of a low-side switch is smaller than that in a diode rectification DC-DC converter, and hence the synchronous rectification DC-DC converter is advantageous particularly to enhancement in conversion efficiency of a DC-DC converter with a low output voltage. There is a problem, however, that because an inductor current is wastefully discharged to a ground via a low-side switch at the time of a low load, the efficiency at the time of the low load decreases.

In order to solve this problem, the following technique has been proposed. That is, PWM (Pulse Width Modulation) control is performed in a high load mode, and PFM (Pulse Frequency Modulation) control is performed in a low load mode. Such two control methods are switchingly used, whereby a high efficiency is achieved over a wide load current range.

In the low load mode of this technique, when an output voltage is smaller than 1.017 Vout in terms of an output set voltage Vout, the switching is continued within a range within which the inductor current is not negative. After the output voltage reaches 1.017 Vout, two high-side and low-side switches are both turned off until the output voltage decreases to 1.006 Vout.

In the low load mode, when a load current increases and the output voltage thus decreases to be equal to Vout, the transition is made from the low load mode to the high load mode. In the high load mode, continuous switching is performed according to the PWM control in synchronization with clocks. At this time, a phase compensator is provided in a control loop in order to secure the stability.

Unfortunately, according to the above-mentioned method, the output voltage needs to be compared with three reference voltages of Vout, 1.006 Vout, and 1.017 Vout in order to perform the PFM operation, and this requires three high-precision comparators.

Further, the switching in the low load mode is controlled such that the inductor current is equal to or more than zero and equal to or less than a predetermined value, and this requires real-time observation of the inductor current value.

Still further, a response when the load current increases in the low load mode and the transition is thus made to the high load mode is determined according to the PWM control, and because the response speed is limited by the phase compensator provided in the PWM control loop, the output voltage temporarily decreases to a large extent with respect to a desired value.

DETAILED DESCRIPTION

According to an embodiment, there is provided a DC-DC converter that steps down an input voltage to a lower output voltage. The converter includes an input terminal, an output terminal, a high-side switch, a low-side switch, an inductor, a capacitor, a high-side switch controlling circuit and a low-side switch controlling circuit.

The input terminal receives the input voltage.

The output terminal outputs the output voltage.

The high-side switch has one end connected to the input terminal.

The low-side switch has one end connected to other end of the high-side switch and other end connected to a ground terminal.

The inductor has one end connected to the other end of the high-side switch and other end connected to the output terminal.

The capacitor has one end connected to the other end of the inductor and other end connected to the ground terminal.

The high-side switch controlling circuit generates a high-side switch controlling signal on a basis of a target voltage of the output terminal, the output voltage of the output terminal, and a current flowing through the capacitor, and supplies the high-side switch controlling signal to the high-side switch, to control on/off states of the high-side switch.

The low-side switch controlling circuit generates a low-side switch controlling signal on a basis of the high-side switch controlling signal and a current flowing through the inductor, and supplies the low-side switch controlling signal to the low-side switch, to control on/off states of the low-side switch.

Hereinafter, an embodiment of the present invention is described in detail with reference to the drawings.

Figure 1:
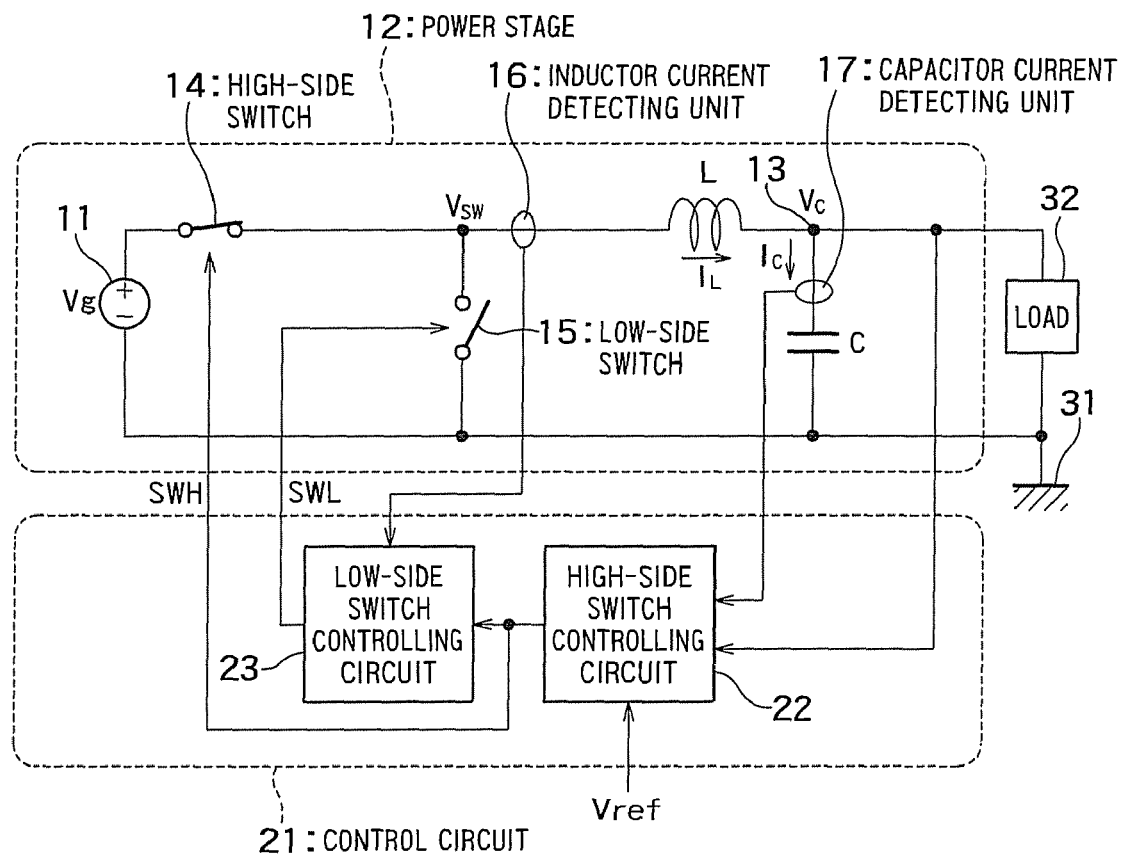
FIG. 1 is a block diagram illustrating a configuration of a DC-DC converter according to an embodiment.

FIG. 1 illustrates a schematic configuration of a DC-DC converter according to a first embodiment.

An input voltage Vg received by an input terminal 11 is stepped down to an output voltage Vc by a power stage 12, and the output voltage Vc is outputted from an output terminal 13. The power stage 12 includes a high-side switch 14, a low-side switch 15, an inductor L, and a smoothing capacitor C. The power stage 12 further includes: an inductor current detecting unit 16 that detects a current flowing through the inductor L; and a capacitor current detecting unit 17 that detects a current flowing through the capacitor C.

The high-side switch 14 has one end connected to the input terminal 11. On/off (on and off) states thereof are switched.

The low-side switch 15 has one end connected to other end of the high-side switch 14 and has other end connected to a ground terminal 31. On/off states thereof are switched.

The inductor L has one end connected to the other end of the high-side switch 14 and has other end connected to the output terminal 13.

The capacitor C has one end connected to the other end of the inductor L and has other end connected to the ground terminal 31.

A circuit for controlling the two switches 14 and 15 in the power stage 12 is a control circuit 21.

The control circuit 21 receives: the output voltage Vc of the power stage 12; a capacitor current value Ic based on the current flowing through the capacitor C; an inductor current value $I_L$ from the inductor current detecting unit 16; and a reference voltage Vref. The reference voltage Vref is a voltage that represents a target value of the output voltage Vc.

A high-side switch controlling circuit 22 generates a high-side switch controlling signal on the basis of a target voltage of the output terminal 13, the output voltage of the output terminal 13, and the current flowing through the capacitor C. The high-side switch controlling circuit 22 supplies the high-side switch controlling signal to the high-side switch 14, to thereby control the on/off states of the high-side switch 14.

More specifically, the high-side switch controlling circuit 22 generates a switching function S as shown in Expression (1) on the basis of (Vc−Vref), that is, an output error voltage and the capacitor current value Ic. Then, the high-side switch controlling circuit 22 generates a high-side switch controlling signal SWH on the basis of whether or not S is more than 0 as shown in Expression (2).

$$S=\alpha(Vc-Vref)+Ic \quad (1)$$

$$SWH=1(S<0), SWH=0(S>0) \quad (2)$$

Note that "α" is a constant in Expression (1). In addition, the high-side switch is turned on when SWH=1, and is turned off when SWH=0.

Note that, in Expression (1), S is a linear function with respect to Vc and Ic, but may be a quadratic or higher-order function.

The high-side switch controlling signal SWH and the inductor current value $I_L$ from the inductor current detecting unit 16 are inputted to a low-side switch controlling circuit 23.

The low-side switch controlling circuit 23 generates a low-side switch controlling signal SWL on the basis of the high-side switch controlling signal SWH and the inductor current value $I_L$ based on the current flowing through the inductor L. The low-side switch controlling circuit 23 supplies the generated low-side switch controlling signal SWL to the low-side switch 15, to thereby control the on/off states of the low-side switch 15.

Specifically, as shown in Table 1, the low-side switch controlling circuit 23 outputs a low-side switch controlling signal of SWL=1 in the case where SWH=0 and $I_L>0$, and outputs a low-side switch controlling signal of SWL=0 in other cases. The low-side switch is turned on when SWL=1, and is turned off when SWL=0.

TABLE 1

| SWH | $I_L$ | SWL |
|---|---|---|
| 0 | − | 0 |
| 0 | + | 1 |
| 1 | * | 0 |

Figure 2:
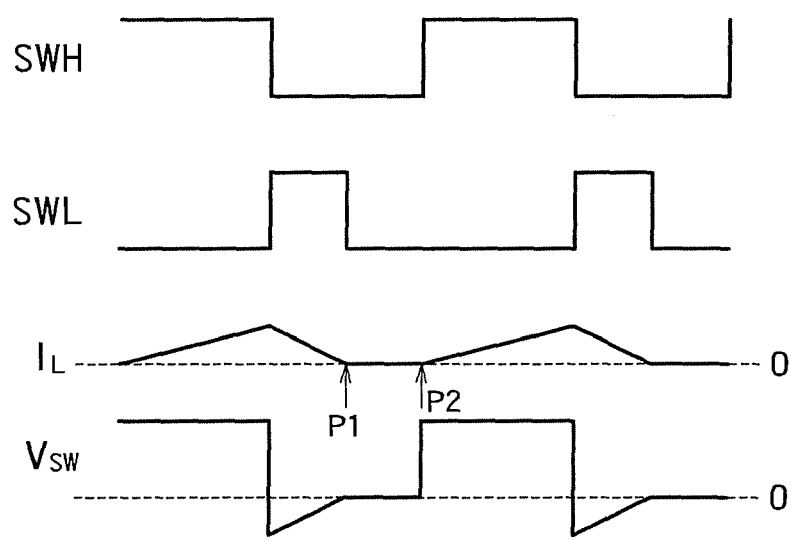
FIG. 2 is a chart showing waveforms of SWH, SWL, $I_L$, and Vsw at the time of a low load.

FIG. 2 shows waveforms of the high-side switch controlling signal SWH, the low-side switch controlling signal SWL, the inductor current $I_L$, and a switching node voltage Vsw. The switching node voltage Vsw is a voltage at the one end of the low-side switch 15 as illustrated in FIG. 1. These waveforms are obtained at the time of a low load current when a current (load current) of the load 32 is small.

Referring to FIG. 2, during a period during which the high-side switch 14 is turned off, the low-side switch 15 is turned off at the same time as the inductor current $I_L$ becomes 0 (such an operation as PFM (Pulse Frequency Modulation) is performed). This can prevent a backward flow of the inductor current even when the current (load current) of the load 32 is small. When the load current is small, if the low-side switch 15 is always on during the off state of the high-side switch 14, part of the current flowing out of the capacitor C is wastefully discharged to a ground via the low-side switch 15 during a period from a time point P1 (at which the inductor current becomes 0) to a time point P2 (at which the high-side switch is turned on next time) shown in FIG. 2. In contrast to this, in the present embodiment, because the low-side switch 15 is turned off during the period from the time point P1 to the time point P2, the inductor current is not wastefully discharged to the ground via the low-side switch 15, and the conversion efficiency at the time of the low load current does not decrease. Accordingly, in the present embodiment, as shown in FIG. 2, the current $I_L$ is 0 during the period from the time point P1 to the time point P2.

In addition, the control of the high-side switch 15 is the same between the time of the high load (when the current of the load 32 is large) and the time of the low load (when the current of the load 32 is small), and hence special control does not need to be added for switching from the low load mode to the high load mode. Further, because the present embodiment proposes a control method not using clocks, a prompt transition can be made from the low load mode to the high load mode regardless of clock timing, and a response upon a load change is fast. Note that, at the time of the high load when the load current value is large, the low-side switch 15 is always on during the off state of the high-side switch 14. When the load current is large, a value of the inductor current $I_L$ does not become smaller than zero (the waveform of $I_L$ is always higher than 0). Accordingly, even if the low-side switch 15 is always on, the current is not wastefully discharged to the ground via the low-side switch 15.

As described above, in the present embodiment, the low load mode (PFM mode) can be implemented without changing the control of the high-side switch 14, and hence special control does not need to be added for the transition from the low load mode to the high load mode. In addition, the inductor current is controlled so as not to flow backward, and hence the efficiency at the time of the low load does not decrease.

Figure 3:
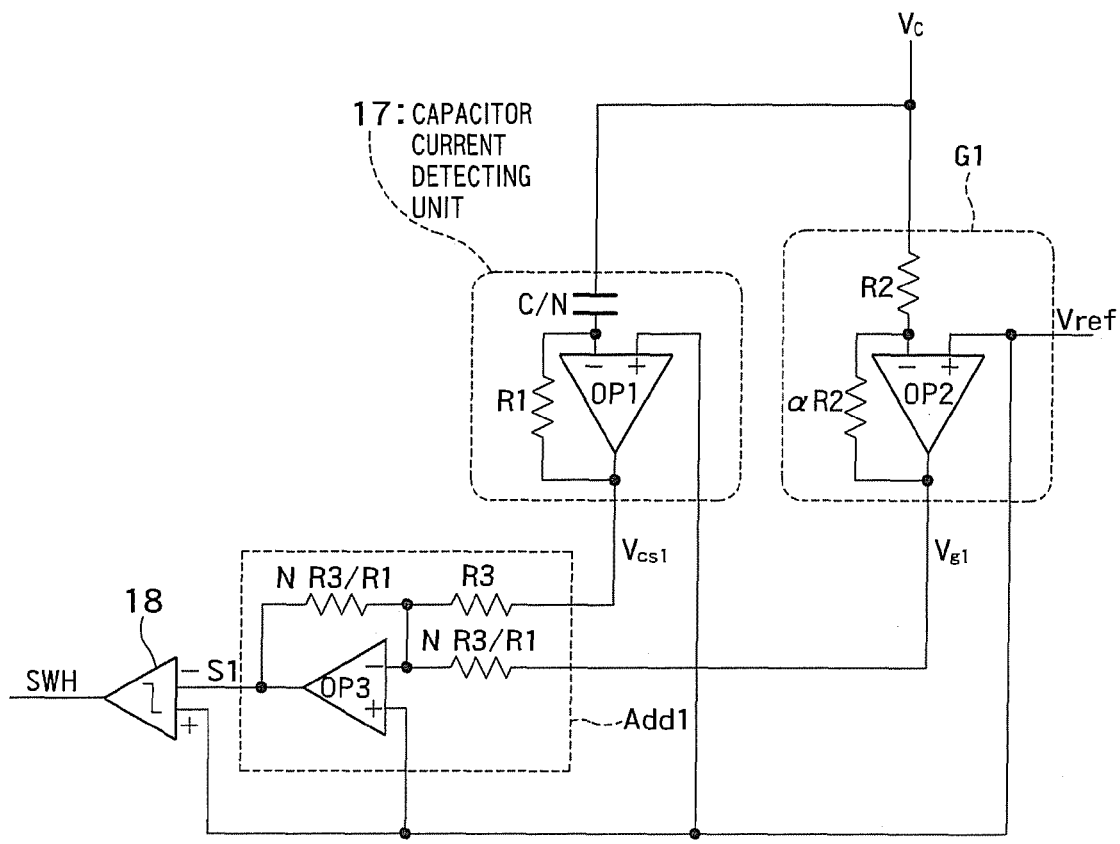
FIG. 3 is a circuit diagram illustrating a specific configuration of a high-side switch controlling circuit.

FIG. 3 illustrates specific configurations of the high-side switch controlling circuit 22 and the capacitor current detecting unit 17. A DC-DC converter having the configurations corresponds to a sliding mode DC-DC converter.

The capacitor current detecting unit 17 is a differentiator configured by a capacitor C/N, a resistor R1, and an operational amplifier OP1. Note that the capacitor current detecting unit 17 may be incorporated inside of the high-side switch controlling circuit 22, or may be provided outside of the high-side switch controlling circuit 22.

The capacitor C/N of the differentiator is connected between the output terminal 13 of the DC-DC converter and a virtual ground point of the operational amplifier OP1. Because a capacitance value of the capacitor C/N is 1/N of the smoothing capacitor C (see FIG. 1), a current of Ic/N flows through the capacitor C/N. As described above, Ic is a current value of the smoothing capacitor C. The current flowing through the capacitor C/N flows into the resistor R1. The capacitor current detecting unit 17 outputs a voltage Vcs1 calculated according to Expression (3). Expression (3) contains a component proportional to the capacitor current Ic.

$$Vcs1 = Vref - (R1/N) \times Ic \quad (3)$$

Meanwhile, the capacitor voltage (output voltage) Vc is detected by a circuit G1 included in the high-side switch controlling circuit 22. The circuit G1 outputs a voltage Vg1 calculated according to Expression (4) on the basis of the output voltage Vc and the reference voltage (target voltage) Vref.

$$Vg1 = Vref - \alpha(Vc - Vref) \quad (4)$$

The voltages Vcs1 and Vg1 are added to each other by an adder Add1. An output voltage S1 of the adder Add1 is obtained as shown in Expression (5).

$$S1 = Vref + \alpha(Vc - Vref) + Ic \quad (5)$$

This voltage and Vref are compared with each other by a comparator 18, whereby the high-side switch controlling signal SWH obtained according to Expression (1) and Expression (2) can be realized. That is, because the right side of Expression (5) is equal to the right side of Expression (1) with Vref being subtracted from the right side of Expression (5), whether or not a value of S1 is larger than Vref is equivalent to whether or not a value of S in Expression (1) is larger than 0.

Figure 4:
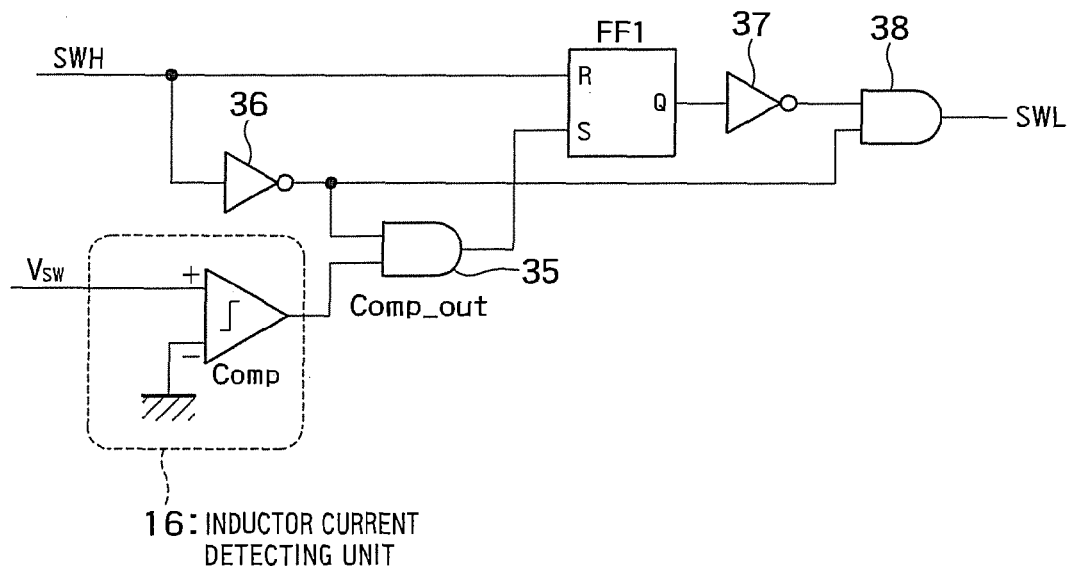
FIG. 4 is a circuit diagram illustrating a specific configuration of a low-side switch controlling circuit.

FIG. 4 illustrates specific configurations of the low-side switch controlling circuit 23 and the inductor current detecting unit 16.

The inductor current detecting unit 16 is configured by a voltage comparator Comp that uses a ground potential (earth potential) as a reference voltage thereof. An output Comp_out of the voltage comparator Comp is inputted to an AND circuit 35. Note that the inductor current detecting unit 16 may be incorporated inside of the low-side switch controlling circuit 23, or may be provided outside of the low-side switch controlling circuit 23.

A signal obtained by inverting the high-side switch controlling signal SWH by an inverter 36 is also inputted to the AND circuit 35. An output of the AND circuit 35 is inputted to a set terminal of a flip-flop FF1. The high-side switch controlling signal SWH is inputted to a reset terminal of the flip-flop FF1. An output of the flip-flop FF1 is inverted by an inverter 37 to be inputted to one input of an AND circuit 38. The output signal of the inverter 36 is inputted to other input of the AND circuit 38. An output of the AND circuit 38 is the low-side switch controlling signal SWL.

As shown in FIG. 2, the switching node voltage Vsw in the power stage 12 of FIG. 1 is equal to the input voltage Vg of the DC-DC converter during the on state of the high-side switch 14, and is equal to a value obtained by multiplying, by −1, a product of an on-state resistance of the low-side switch 15 and the inductor current during the on state of the low-side switch 15. Accordingly, during the off state of the high-side switch 14, the polarity of the inductor current $I_L$ can be determined by observing Vsw. As shown in Table 1, for the low-side switch control, it is sufficient to determine the polarity of the inductor current, and hence the inductor current detecting unit 16 can be configured by only the comparator Comp. That is, the current detection can be achieved by only one voltage comparator.

As is apparent from the configurations illustrated in FIG. 4, when the high-side switch controlling signal SWH is 1, the low-side switch controlling signal SWL is always 0. Accordingly, the high-side switch 14 and the low-side switch 15 are not turned on at the same time. During a period during which SWH is 0, if the Comp output Comp_out is 0, that is, $I_L > 0$, SWL becomes 1, and the low-side switch 15 is turned on. During the period during which SWH is 0, if the Comp output is 1, that is, $I_L < 0$, the flip-flop FF1 is set, and SWL immediately becomes 0, so that both the high-side switch 14 and the low-side switch 15 are turned off. The operation as described above enables the operation shown in Table 1.

Figure 5:
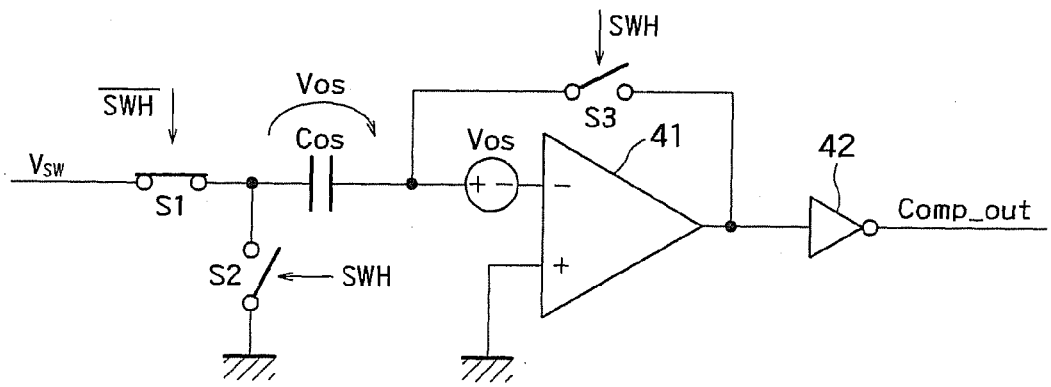
FIG. 5 is a circuit diagram illustrating a configuration of a comparator used in an inductor current detecting unit.

FIG. 5 illustrates a configuration example of the comparator Comp. This comparator performs offset cancellation.

During a period during which the high-side switch controlling signal SWH=1, a switch S1 is turned off, and switches S2 and S3 are turned on. This makes a voltage across a capacitor Cos equal to an equivalent input offset voltage Vos of an amplifier 41. The comparator Comp operates as a comparator during the period during which SWH=0, and during this period, the switch S1 is turned on, and the switches S2 and S3 are turned off. The capacitor Cos is charged at the offset voltage Vos, and hence the capacitor voltage and the equivalent input offset voltage of the amplifier are cancelled. In this way, offset extraction is performed using a period during which the comparator operation is not necessary, that is, the period during which SWH=1, whereby a high-precision comparator can be achieved regardless of the offset of the amplifier 41. Accordingly, the polarity of the inductor current can be detected with high precision. Note that the output Comp_out of this comparator is obtained by inverting an output of the amplifier 41 by an inverter 42.

Figure 6:
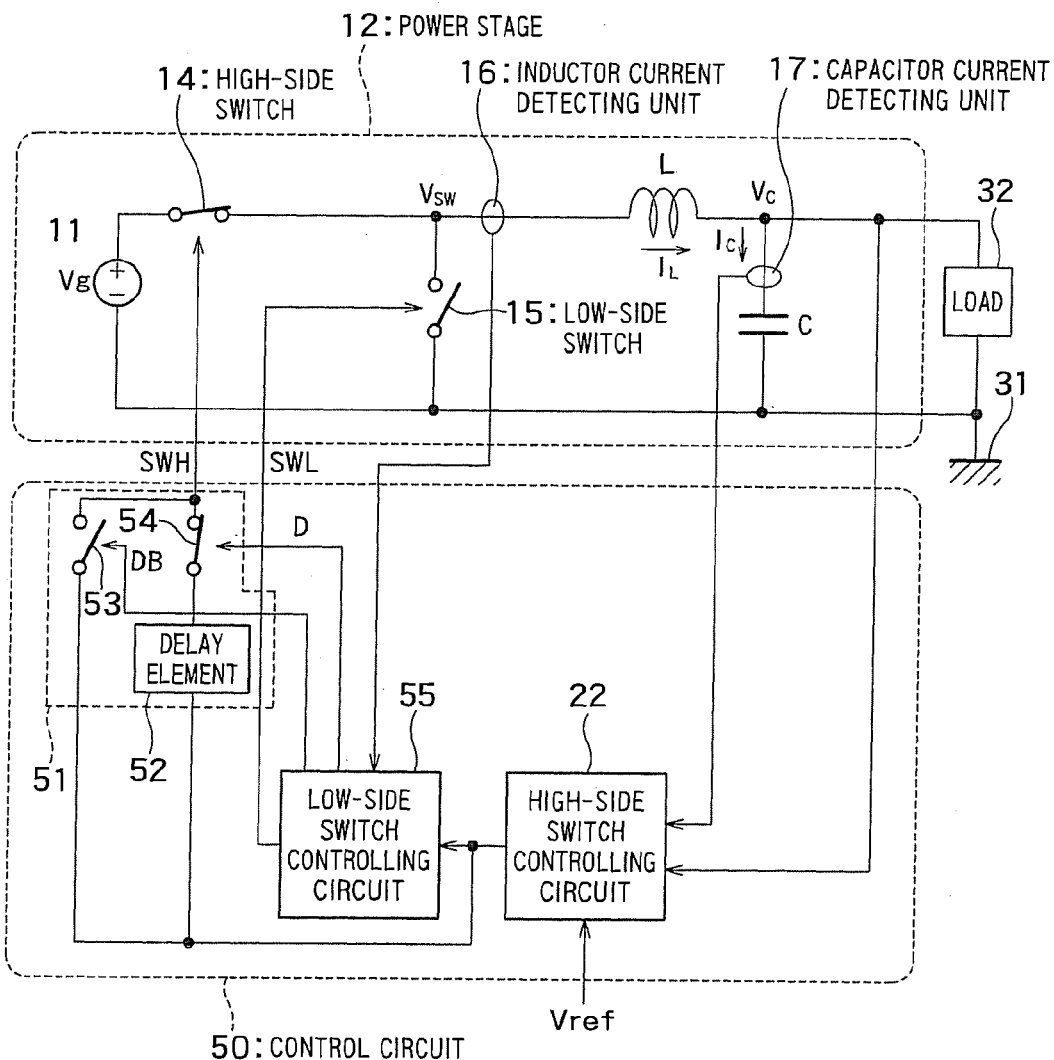
FIG. 6 is a block diagram illustrating a configuration additionally including a delay element that gives a delay to a high-side switch controlling signal in a low load mode.

FIG. 6 illustrates a configuration that adjusts a pulse width of the high-side switch controlling signal SWH at the time of a low load.

A circuit 51 is added to the configuration illustrated in FIG. 1, and the circuit 51 gives a delay to the high-side switch controlling signal to supply the resultant signal to the high-side switch 14. The circuit 51 includes a delay element 52 and two switches 53 and 54. On/off states of the switch 54 are switched by a delay controlling signal D, and on/off states of the switch 53 are switched by a delay controlling signal DB. The delay controlling signals D and DB are supplied from a low-side switch controlling circuit 55. The delay controlling signals D and DB are complementary signals. When D=1 and DB=0, the switch 54 is turned on, and the switch 53 is turned off. At this time, the high-side switch controlling signal SWH from the high-side switch controlling circuit 22 is supplied to the high-side switch 14 with the intermediation of the delay element 52. When D=0 and DB=1, the switch 54 is turned off, and the switch 53 is turned on. At this time, the high-side switch controlling signal SWH is supplied to the high-side switch 14 without the intermediation of the delay element 52.

Figure 7:
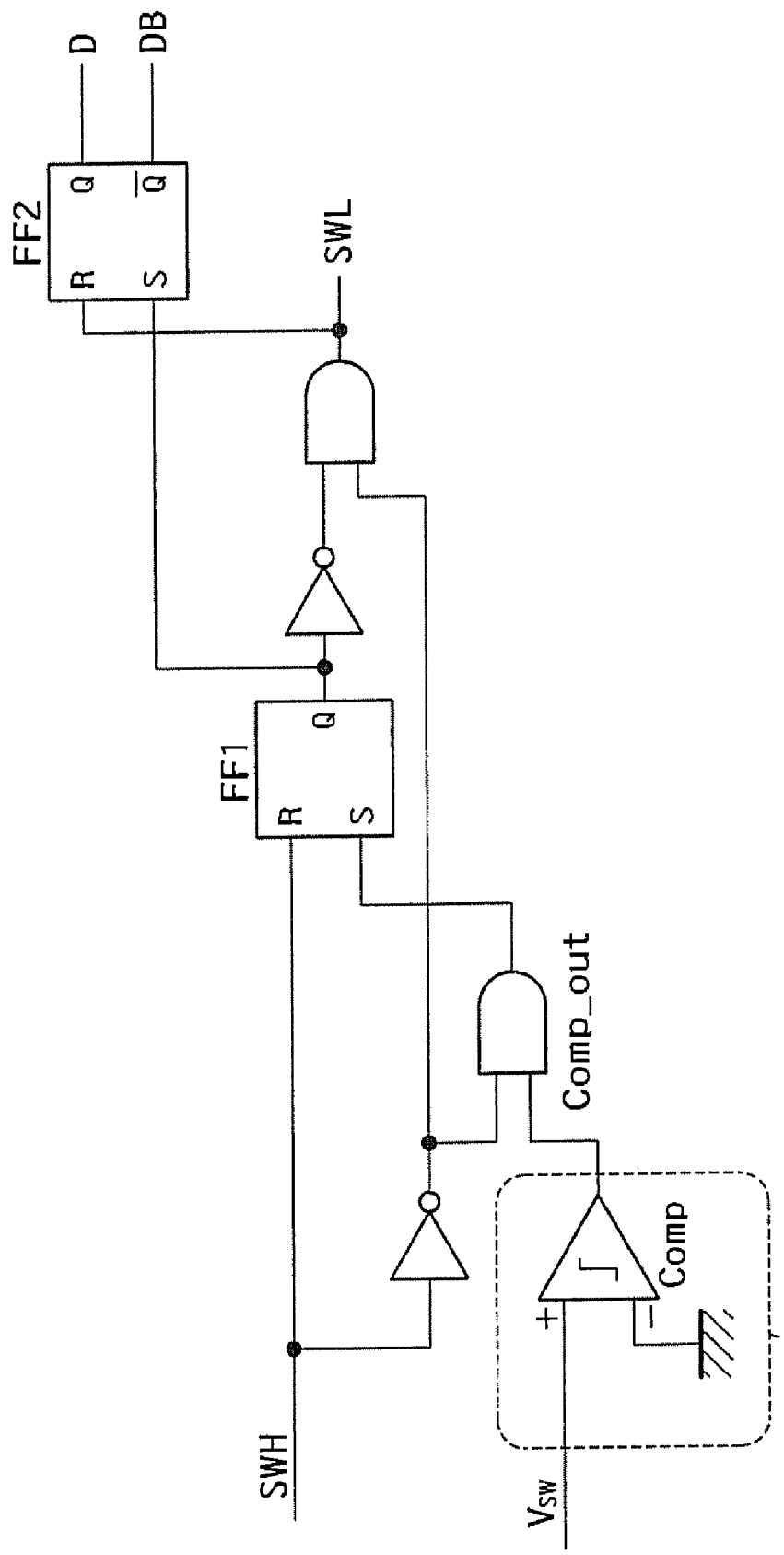
FIG. 7 is a circuit diagram illustrating a specific configuration of a low-side switch controlling circuit in the configuration of FIG. 6.

FIG. 7 illustrates a configuration of the low-side switch controlling circuit 55 for outputting the delay controlling signals D and DB.

Compared with the low-side switch controlling circuit 23 illustrated in FIG. 4, a flip-flop FF2 is added. At the time of a load that is low enough to cause a PFM (Pulse Frequency Modulation) operation, during the period during which the high-side switch controlling signal SWH=0, an output of the inductor current detecting unit 16 becomes 1, and the flip-flop FF1 is set. The flip-flop FF2 receives an output of the flip-flop FF1 to be set, and thus outputs D=1 and DB=0. This gives a delay to the high-side switch controlling signal in the configuration of FIG. 6. That is, at the time of the low load, the delay is given to the high-side switch controlling signal. More specifically, after the off states of both the high-side switch 14 and the low-side switch 15, when the high-side switch 14 is turned on and the low-side switch 15 is turned off, a signal for turning on the high-side switch 14 is supplied to the high-side switch 14 with a delay being given to this signal by the delay element 52.

Because a delay is given as described above, the high-side switch controlling signal SWH does not change rapidly, and the SWH pulse width can be made longer by the given delay. Because the SWH pulse width is set to be longer, the capacitor C can be charged more, and a current is supplied by this capacitor C, whereby an unnecessary high-speed operation of the high-side switch 14 can be avoided at the time of a low load. That is, a switching interval of the high-side switch 14 is set to be longer, whereby the number of switching operations can be reduced, resulting in low power consumption. Note that the delay element 52 is used only at the time of a low load, and the high-side switch 14 is controlled without giving a delay thereto at the time of a high load, in order to prevent fluctuations in output voltage. That is, at the time of the high load, the switch 54 is always off, and the switch 53 is always on.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A DC-DC converter which steps down an input voltage to a lower output voltage, comprising:
    an input terminal to receive the input voltage;
    an output terminal to output the output voltage;
    a high-side switch having one end connected to the input terminal;
    a low-side switch having one end connected to other end of the high-side switch and having other end connected to a ground terminal;
    an inductor having one end connected to the other end of the high-side switch and having other end connected to the output terminal;
    a capacitor having one end connected to the other end of the inductor and having other end connected to the ground terminal;
    a high-side switch controlling circuit configured to generate a high-side switch controlling signal on a basis of a target voltage of the output terminal, the output voltage of the output terminal, and a current flowing through the capacitor, and supply the high-side switch controlling signal to the high-side switch, to control on/off states of the high-side switch; and
    a low-side switch controlling circuit configured to generate a low-side switch controlling signal on a basis of the high-side switch controlling signal and a current flowing through the inductor, and supply the low-side switch controlling signal to the low-side switch, to control on/off states of the low-side switch.

2. The converter according to claim 1, wherein
the high-side switch controlling circuit generates the high-side switch controlling signal on a basis of a polarity of a weighted sum of: a value of the target voltage; a value of the output voltage; and a value of the current flowing through the capacitor.

3. The converter according to claim 1, wherein
during the off state of the high-side switch, the low-side switch controlling circuit supplies a control signal to turn on the low-side switch to the low-side switch, when the current flows from the one end of the inductor to the other end of the inductor; and supplies a control signal to turn off the low-side switch to the low-side switch, when the current flows from the other end of the inductor to the one end of the inductor.

4. The converter according to claim 3, wherein
the low-side switch controlling circuit compares a voltage at the one end of the inductor with a predetermined voltage using a comparator, to detect a direction of the current flowing through the inductor.

5. The converter according to claim 4, wherein
the low-side switch controlling circuit detects an offset voltage of the comparator during the on state of the high-side switch, and cancels an offset of the comparator using the offset voltage when the high-side switch is turned off.

6. The converter according to claim 1, wherein
when the high-side switch is to be turned on and the low-side switch is to be turned off after both the high-side switch and the low-side switch are turned off, the high-side switch controlling circuit supplies the high-side switch controlling signal to turn on the high-side switch with a delay being given to the high-side switch controlling signal by a delay element.

\* \* \* \* \*